Aug. 19, 1941.  C. J. FUSCO  2,252,886

STAPLING MACHINE

Filed Aug. 1, 1939  2 Sheets-Sheet 1

INVENTOR.
Carlo J. Fusco
BY
J. E. Trabucco
ATTORNEY.

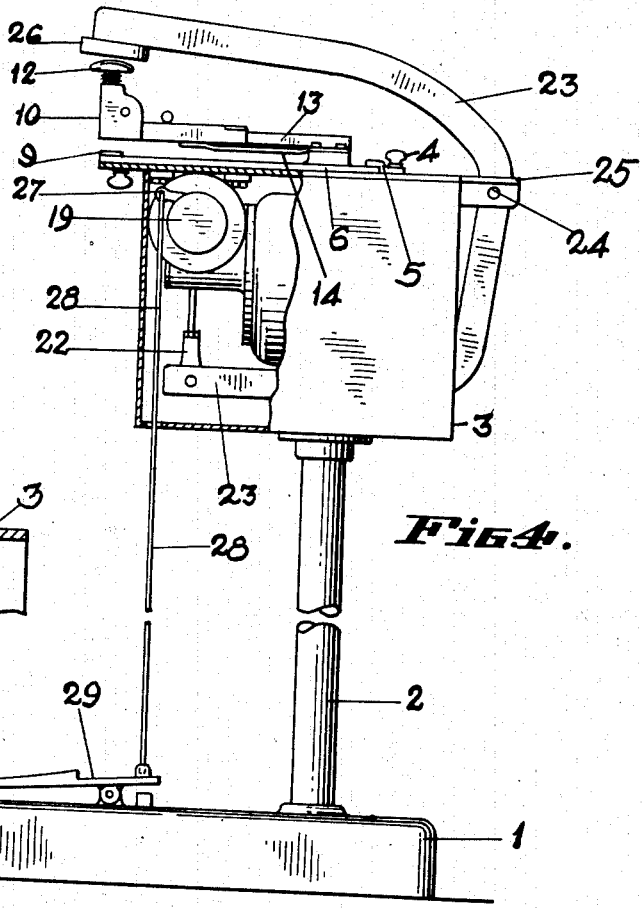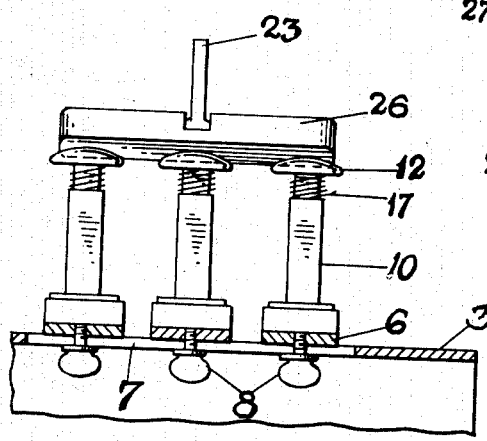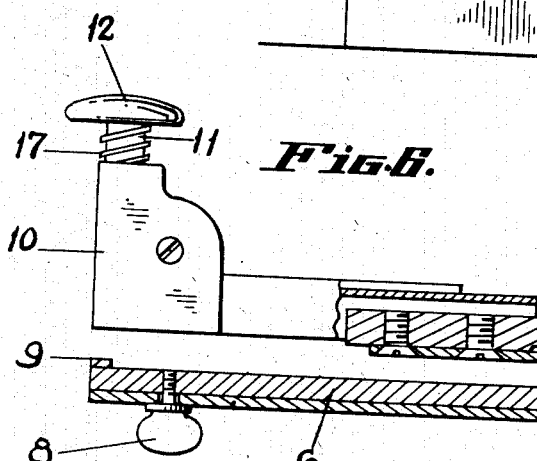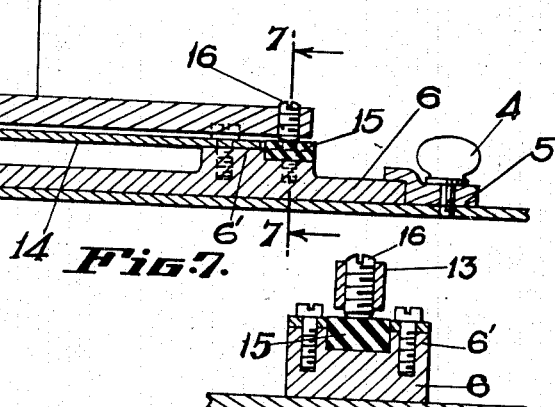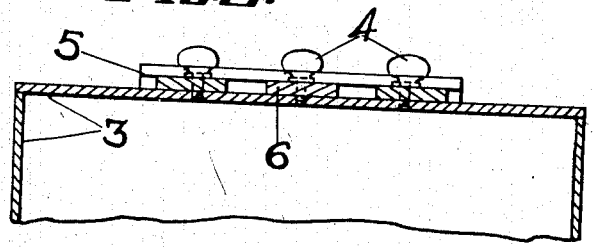

Patented Aug. 19, 1941

2,252,886

UNITED STATES PATENT OFFICE 2,252,886

STAPLING MACHINE

Carlo J. Fusco, San Francisco, Calif.

Application August 1, 1939, Serial No. 287,777

5 Claims. (Cl. 1—3)

This invention relates to improvements in stapling machines.

An object of my invention is to provide an improved automatic stapling machine having a novel operating mechanism by means of which the operation may be either continuous or intermittent.

A further object of my invention is to provide an improved automatic stapling machine having novel operating means which may be conveniently controlled to permit the simultaneous application of a plurality of staples in a continuous manner or intermittently, as desired.

Other and further objects of my invention will be pointed out hereinafter or will be indicated in the appended claims, or will be obvious to one skilled in the art upon an understanding of the present disclosure. For the purpose of this application I have elected to show herein certain forms and details of an automatic stapling machine representative of my invention; it is to be understood, however, that the embodiments of my invention herein shown and described are for the purpose of illustration only, and that therefore it is not to be regarded as exhaustive of the variations of the invention, nor is it to be given an interpretation such as might have the effect of limiting the claims short of the true and most comprehensive scope of the invention in the art.

In the accompanying drawings:

Fig. 4 is a side elevation of the machine, showing the opposite side thereof, the housing being broken away to disclose the operating mechanism;

Fig. 5 is a front sectional view, taken on the line 5—5 of Fig. 2;

Fig. 6 is a vertical longitudinal section taken through one of the staplers, showing the manner in which it is mounted on the supporting structure;

Fig. 7 is a sectional view taken on the line 7—7 of Fig. 6; and

Fig. 8 is a sectional view taken on the line 8—8 of Fig. 2.

Figure 1:
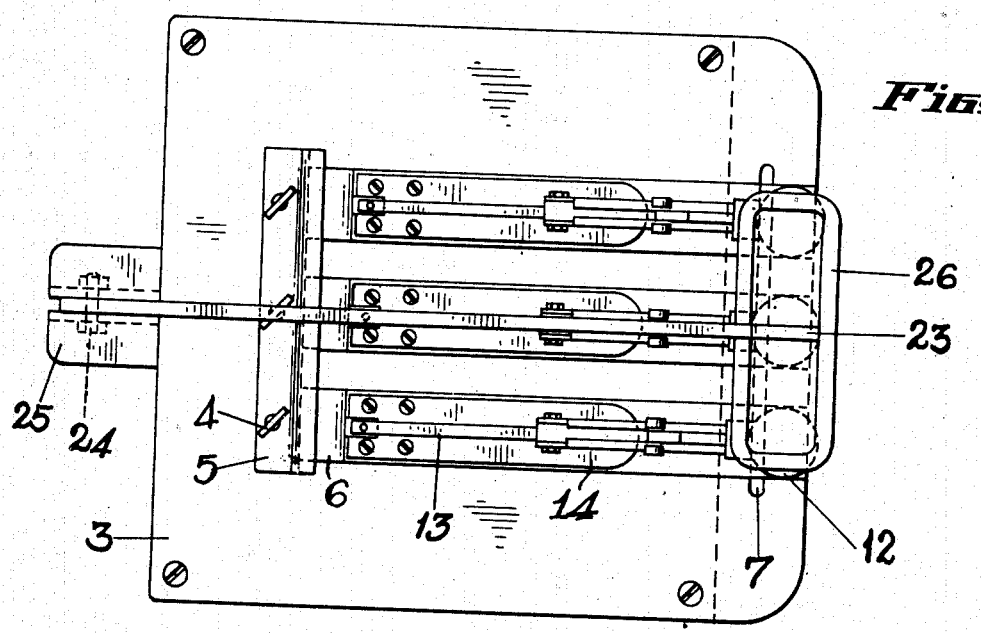
Fig. 1 is a top plan of a stapling machine embodying my invention.
Figure 2:
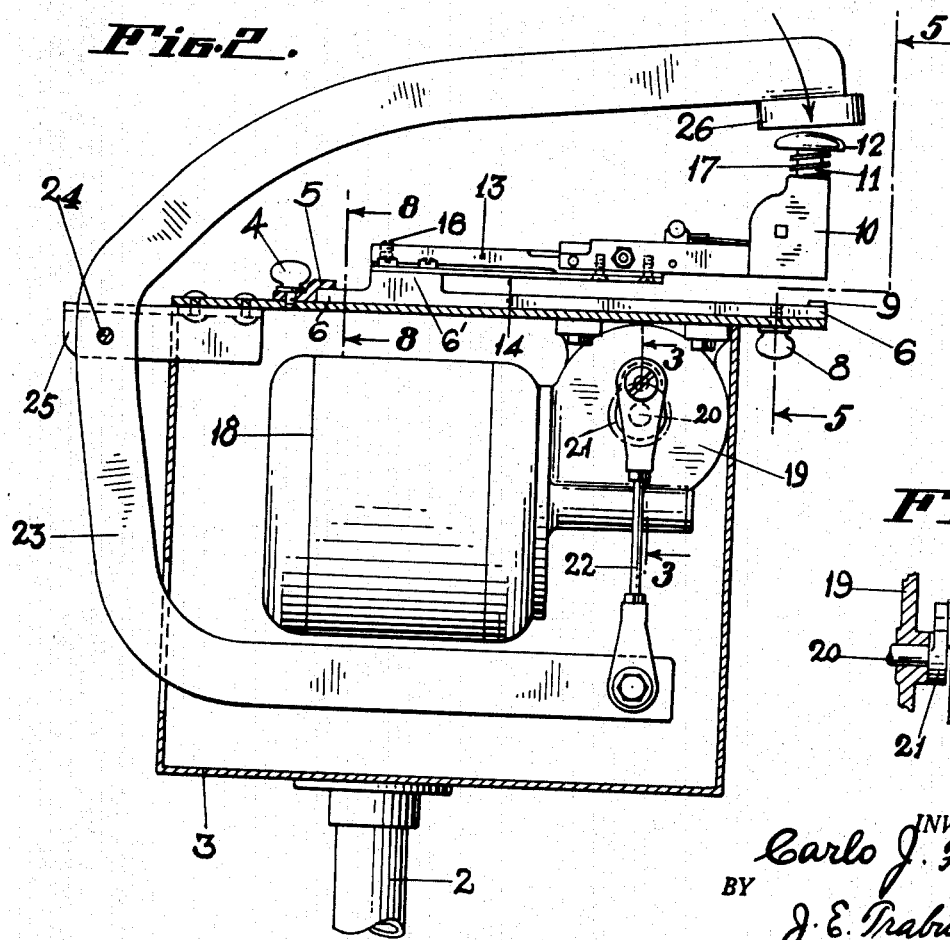
Fig. 2 is a side elevation of the same, showing the housing in section.

Referring to the drawings, the numeral 1 designates a supporting pedestal having an upstanding column 2 on the upper end of which is mounted a housing 3.

Detachably secured to the flat upper side of the housing, as by wing screws 4 is a transversely disposed elongated bar or keeper 5 which is adapted to adjustably maintain the rear ends of the base plates 6 of a plurality of staplers in fixed relative positions to one another. The flat upper side of the housing 3 is provided with a forwardly projecting part provided with a transversely disposed slot 7 which is positioned substantially in parallel relation to the keeper 5. The front ends of the base plates 6 of the staplers extend forwardly across the slot 7, and wing screws 8 adjustably extending through the said slot enter threaded holes in the said base plates and serve to maintain the forward ends of the said base plates securely in place. Thus by means of the keeper 5 the wing screws 4, the slot 7 and the wing screws 8, the staplers may be maintained in suitably adjusted positions with respect to one another. This same securing means may conveniently and without the necessity of any structural alteration, be used to maintain the staplers in any suitable laterally spaced positions with respect to one another, or the said means may be employed to secure a lesser or a greater number of staplers in operative positions on the upper side of the housing.

For illustration purposes I have shown what is commonly known as the hand operated "Ace" stapling machine, but various other kinds of staplers may also be satisfactorily utilized with my improved operating mechanism. The staplers illustrated herein each comprise the usual base plate 6, a stapling anvil 9 at the front end of the plate, a stapling head 10, a reciprocating staple engaging and actuating plunger 11, a press button 12 and a frame 13 movably mounted on the base plate. My contribution to the prior art in so far as staplers are concerned comprises means for adapting the hand operated device to automatic use, for without these improvements the rapid and continuous operation of the hand operated type of stapler is impossible. To the underneath side of the frame 13 of each stapler, at points near the center thereof, is secured as by screws, one end of an elongated metal spring 14. The opposite or rearwardly disposed end of the spring 14 is secured as by screws, to a raised protuberance 6' on the base plate 6. The pressing in a downward direction of the plunger press buttons 12 causes the springs 14 to allow the heads 10 to move toward and engage the anvils 9. So as to prevent undue noise and vibration during the rapid operation of the staplers I have provided buffer means at the rear ends of the frames 13, the same comprising a resilient rubber pad 15 secured to the upwardly disposed protuberance 6' of each base plate 6 and a set screw 16 secured to the said frame 13 and positioned to engage with said pad. So that the head 10 of each stapler may be pressed downwardly into an engaging position with its associated anvil 9 prior to the actual movement of the actuating plunger 11 within said head, I have positioned a spiral spring 17 of predetermined tension between the press button 12 and the said head, the said spring preventing the said press button from moving toward the said head until the latter engages with the anvil or with material resting on or engaging with the anvil. The spring 17, after the head engages with the anvil, is compressed, and the plunger 11 thereupon carries a staple toward and into engaging relation with the anvil. The movement of the head 10 into engagement with the anvil (or with the material usually positioned between the anvil and the head during the actual operation of the device) prior to the operation of the plunger 11 within the said head insures the positive functioning of the device when high speed operation thereof is in progress, for by providing such a movement there is an elimination of undue vibration and the head is carried into its proper relative position with respect to its associated anvil each time the press button 12 is depressed. The spring 17 causes the head 10 to move with vertical reciprocating motion toward and away from the anvil 9, and at the same time the said spring prevents any lateral movement of the head during its vertical reciprocation. The proper engagement of the head with the anvil is thereby secured.

Figure 3:
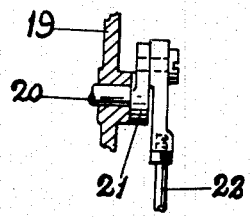
Fig. 3 is a sectional view taken on the line 3—3 of Fig. 2.

The actuating means for the staplers is described as follows:

Suitably supported in the housing is an electric motor 18 which is adapted to operate suitable well known mechanism positioned in a casing 19. This mechanism comprises a drive shaft, and transmission means interposed between the drive shaft and cooperating clutch units. One of the clutch units is connected by a shaft 20 to a crank 21 (see Fig. 3) and the said crank is connected by a connecting link 22 to one end of a substantially U-shaped lever member 23. The lever member is pivoted somewhat centrally as at 24 on a rearwardly disposed supporting bracket 25 secured to the top of the housing 3. The upper portion of the lever member overlies the top of the housing 3 and is provided at its forward end with a rubber faced press button engaging member 26 which is adapted to contact with and simultaneously depress the press buttons 12 when the forward end of the lever member 23 is actuated downwardly. The cooperating clutch units housed in the casing 19 are normally out of engagement, and at such time the motor 18 is permitted to rotate its drive shaft without causing the operation of the lever 23. The clutch operating mechanism comprises a lever 27 connected by a link 28 to a foot control treadle 29 pivotally mounted on the supporting pedestal 1. By suitably actuating the lever 27 the clutch units are brought into engagement, thereby operatively connecting the motor with the operating lever 23. During each revolution of the clutch shaft 20 and the crank 21, the connecting link 22 is actuated first downwardly and then upwardly. As the forward end of the operating lever 23 and the button engaging member 26 are moved downwardly, the press buttons 12 are first engaged and then depressed, thereby causing the stapler heads 10 to be carried downwardly against the pressure of the elongated spring members 14 into engagement with the anvils 9 or the material positioned thereon. With the forward end of the lever member 23 being moved to its extreme downward position, the plungers 11 are thereupon actuated downwardly to complete the stapling operation. During the remainder of the cycle the lever member 23 is moved about the pivot 24 in a reverse direction, thereby causing the button engaging member 26 to be raised above and disengaged from the press buttons 12. The plungers 11 and the heads 10 are returned to their normal positions by the springs 17 and 14, respectively. The continuous reciprocation of the lever member 23 and the consequent continued operation of the staplers may be accomplished by maintaining the control treadle 29 in a position whereby the clutch units are engaged. By operating the treadle 29 in such a manner that the clutch units are in engagement for but a certain period, the lever may be actuated so only one stapling operation is performed.

I claim:

1. In mounting means for staple machines, a substantially horizontal supporting member, an elongated slot in the supporting member, a detachable elongated keeper secured to the supporting member and positioned in substantially parallel relation to the slot, the said keeper being adapted to engage and hold a rearwardly disposed part of one or more stapling machines which are supported on the supporting member, and means extending through the slot for adjustably securing the forward ends of the stapling machines to the said supporting member.

2. In mounting means for stapling machines, a substantially horizontal support having an elongated slot therein, a keeper detachably secured to the support and positioned in substantially parallel relation to the slot, the said keeper having means for receiving the rear ends of a plurality of base plates of stapling machines, and means extending through the slot and engaging with the forward ends of the base plates.

3. In combination, a support, an anvil on the support, a stapling head engageable with and normally positioned in spaced relation with respect to the anvil and mounted to reciprocate toward and away from the anvil, an elongated spring secured at one end to the support and at its opposite end to the head, whereby the reciprocating movement of the head may be confined within a definite path and the head may be returned to its normal position after its movement toward the anvil and resilient buffer means for partially absorbing the upward force exerted by the spring in returning the head to its upwardly disposed normal position, whereby the head at the end of its upward stroke will be substantially prevented from vibrating.

4. In combination, a support having an anvil secured thereto, an elongated frame member, a stapling head secured to the forward end of the frame member, the said stapling head being engageable with the anvil but normally positioned in spaced relation thereto, an elongated spring member connected at its rear end to the support and at its forward end to the frame member at a point intermediate the latter's ends, and buffer means interposed between the rear end of the frame member and the support.

5. In combination, a support having an anvil secured thereto, an elongated frame member mounted so its forward end is adapted to move up and down with reciprocatory motion, a reciprocatory stapling head carried by the forward end of the frame member and positioned so it engages with the anvil on its downward movement, an elongated metal spring anchored at its rear end to the support and secured at its forward end to the frame member at a point intermediate the ends of the latter, and yieldable means interposed between the support and the rear end of the frame member for intercepting the rear end of the frame member in its downward movement when the spring member actuates the forward end of the said frame member in an upward direction.

CARLO J. FUSCO.